United States Patent [19]

Hagstrom et al.

[11] 4,240,561
[45] Dec. 23, 1980

[54] FLANGED CONNECTION FOR PRESSURE VESSEL

[75] Inventors: Jon Hagstrom, Clarendon Hills; Thomas J. Ahl, Orland Park; James S. Vasilion, Downers Grove, all of Ill.

[73] Assignee: Chicago Bridge & Iron Company, Oak Brook, Ill.

[21] Appl. No.: 39,506

[22] Filed: May 16, 1979

[51] Int. Cl.³ .................... B65D 45/00; B65D 53/00
[52] U.S. Cl. ........................................ 220/3; 220/327; 220/378; 277/12; 277/112; 277/117; 277/119; 292/256.71
[58] Field of Search ............... 220/3, 327, 328, 378; 292/256.71, 256; 285/421; 277/12, 112, 102, 117, 119, 104

[56] References Cited

U.S. PATENT DOCUMENTS

| 2,054,336 | 9/1936 | Penick et al. | 277/104 |
| 2,223,319 | 11/1940 | Jacocks | 292/256.71 X |
| 2,296,710 | 9/1942 | Fischer | 220/328 |
| 2,584,100 | 1/1952 | Uecker | 220/328 |
| 2,903,152 | 9/1959 | Kuo | 220/328 |
| 2,919,048 | 12/1959 | Harvey | 220/327 X |
| 3,235,272 | 2/1966 | Smith | 277/117 X |
| 3,279,644 | 10/1966 | Robertson | 220/378 X |
| 3,437,230 | 4/1969 | Savory | 220/327 |
| 3,451,585 | 6/1969 | Jorgensen | 220/327 |
| 3,460,710 | 8/1969 | Vogeli | 220/327 |
| 3,522,901 | 8/1970 | Rauschenplat | 220/327 |
| 4,138,030 | 2/1979 | Anderson | 220/3 |

FOREIGN PATENT DOCUMENTS 55980 9/1952 France ........................... 220/327

*Primary Examiner*—Allan N. Shoap
*Attorney, Agent, or Firm*—Merriam, Marshall & Bicknell

[57] ABSTRACT

An improved joint for removably attaching first and second members together. The first member has a circular opening and a circular wall surrounding the opening and projecting axially outwardly from the opening. A double curved second member with a circular periphery has an annular flange with an inner surface surrounding the first member wall. Transmittal of radial forces from the second member annular flange to the first member wall is effected by contact of the walls with each other or by a spacer between and in contact with the walls. Removably securing the first and second members together is effected by shear studs or other securing devices.

6 Claims, 5 Drawing Figures

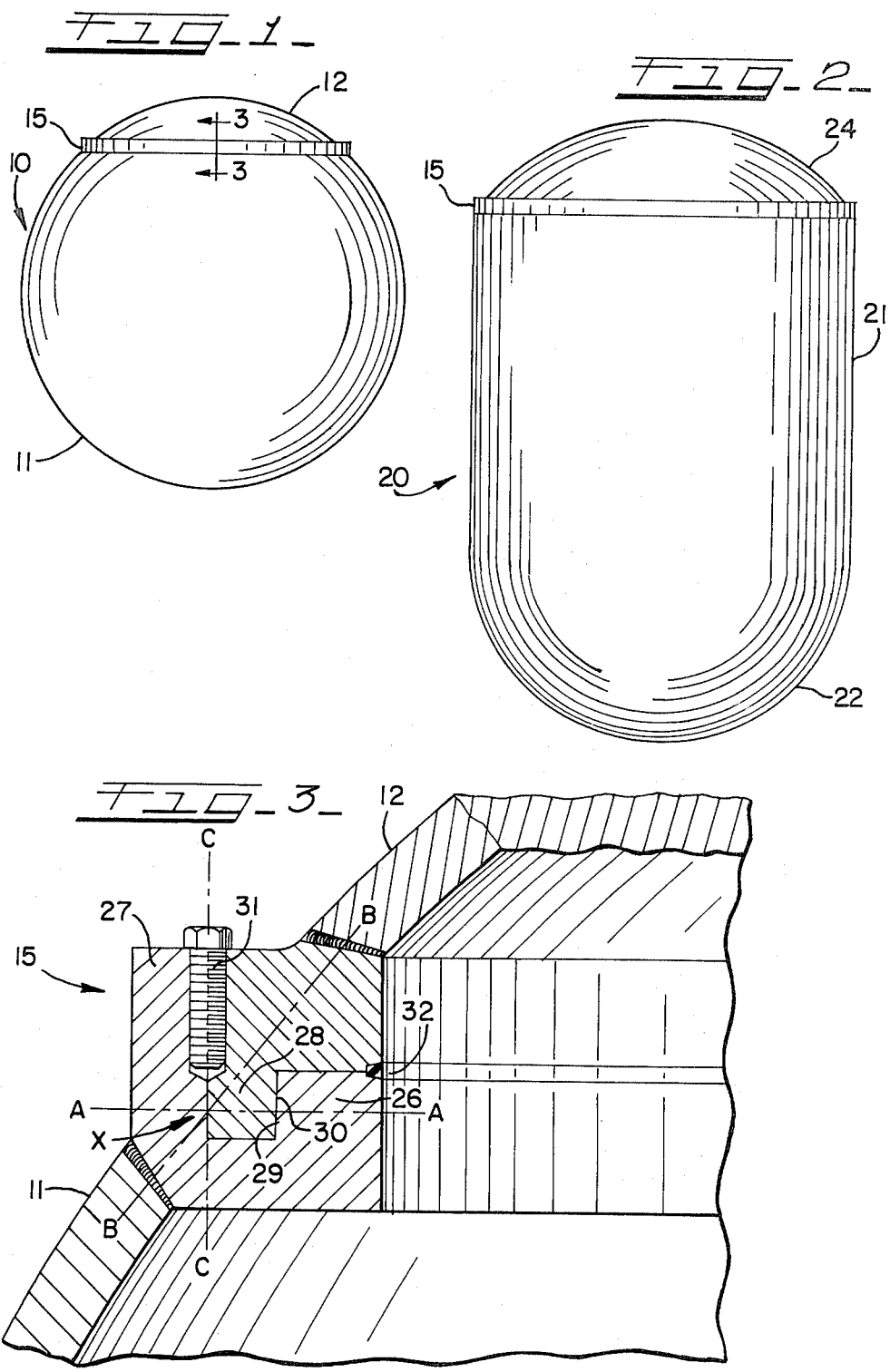

FLANGED CONNECTION FOR PRESSURE VESSEL

This invention relates to high pressure and/or high temperature vessels using joint structures in which at least two members are releasably secured together through a common interface or joint. More particularly, the invention is concerned with such a joint structure in which one or both members being joined has a double curved shell or wall.

BACKGROUND

In many commercial as well as experimental processing operations, it is necessary to join together two members by a sealing means which prevents the escape of liquids, gases or vapors under pressure through the joint. In addition to withstanding high pressures, the joint must often be able to withstand relatively high temperatures. The formation of joint structures suitable for such conditions is compounded by a need to have such joints periodically opened and resealed. Accordingly, to completely satisfy the requirements, the joint structure must not only be able to prevent leakage under the high pressure, and perhaps high temperature, to which it is subjected but must also be one which can be opened and closed by suitable means.

Joint structures of different types are presently used in processing vessels which employ high pressures and temperatures. Such vessels generally contain a walled body having an opening which is closed by a head, cover or closure. The opening in the vessel normally has a rim or flange structure which mates or nests with an opposing face on the head or cover. Since it is often essential that there be periodic access to the vessel interior, the head or cover is releasably secured to the vessel. To prevent leakage at the interface between the cover and the vessel, various types of gaskets and sealing means are used.

SUMMARY OF THE PRIOR ART

The article by S. M. Jorgensen "Designs For Closures and Shell Joints" in Mechanical Engineering, pages 24 to 31, June 1969, provides a discussion of the problems involved in effectively sealing a closure or head over a pressure vessel opening and also illustrates a number of pressure vessel closure and seal designs, including those which employ shear studs in an annular interface between the closure periphery and the vessel opening.

Jorgensen U.S. Pat. No. 3,398,853 discloses a shear stud vessel closure and shell joint.

Larsen U.S. Pat. No. 3,549,186 discloses a quick opening closure using split shear studs.

Although the prior art shows useful high pressure joints and seals, there is a need for alternative joints and seals which withstand high pressures without significant leaking, so that an engineer is able to select the joint believed most suitable for the design conditions to be satisfied.

When the walled body or shell of a vessel in comprised of one or more members having a double curvature, a closure releasable joint for the vessel could be subjected to rotational forces which, unless resisted satisfactorily, would cause the closure joint to leak or fail structurally. As used herein, a walled body or shell has a "double curvature" when a straight line cannot lie in the surface of the wall or shell.

A releasable joint between a closure having a double curvature and a circular periphery, and a circular opening in the body of a single curvature vessel, such as a vessel with a cylindrical body portion, or a circular opening in a double curvature vessel, such as a vessel having a body portion which is a portion of a sphere or is elliptical in section, must be capable of successfully withstanding the radial forces applied around the circular periphery of the closure as a result of pressure on the closure interior surface and axial forces perpendicular to the radial forces applied against the closure periphery, by means of bolts, shear studs or a breech lock structure used to releasably join the closure to the vessel body. There is a need for a joint structure which can be suitably employed to join a double curved member, such as a closure, to a vessel body which is adapted for use in connection with a member for closing large openings, and which can be fabricated by means of conventional techniques with acceptable tolerances.

SUMMARY OF THE INVENTION

According to the present invention there is provided an improved joint for removably attaching together two members of a high temperature and/or high pressure vessel.

More specifically, the improved joint provided by the invention for removably attaching two members together comprises a first member having a circular opening and a circular wall surrounding the opening and projecting axially outwardly from the opening, a double curved second member with a circular periphery having an annular flange with an inner surface surrounding the first member wall, means for transmitting radial forces from the second member annular flange to the first member wall, and means at the joint for removably securing the first and second members together. The first member can constitute the main body of a high temperature and/or high pressure vessel and the second member can constitute a closure or removable cover for the vessel.

The first member wall and the second member flange desirably are so positioned that radial forces when applied to the second member flange intersect the lines of force through the members at the joint and the lines of force through the means for removably securing the first and second members together.

The first member can have either a single curvature or a double curvature extending from the opening therein.

The improved joint can also include a sealing means so positioned as to prevent leakage through the joint when the two members are part of a pressure vessel.

The means for transmitting radial forces from the second member annular flange to the first member wall can simply constitute substantial contact between those elements. Alternatively, the means for transmitting radial forces from the second member annular flange to the first member wall can constitute an adjustable spacer.

The invention provides a further embodiment of the improved joint for removably attaching two members together comprising a first member having a circular opening and a circular trough surrounding the opening defined by a pair of spaced apart inner and outer walls, a double curved second member with a circular periphery having an annular flange with an outer peripheral surface adjoining and complementary to the trough outer wall inner surface, means for transmitting radial forces from the second member annular flange to the first member inner wall, and means at the joint for removably securing the first and second members together.

In a more detailed embodiment, the present invention provides a joint improvement in a pressure vessel having a walled body, which may have a shape with a single or double curvature, with an opening, and a double curvature closure for the opening of the walled body securable in place by connecting means, with the improvement comprising a circular trough in the walled body surrounding the opening defined by a pair of spaced apart inner and outer walls, with said inner wall being sloped, said closure having an annular flange with an outer peripheral surface adjoining and complementary to the trough outer wall, said closure annular flange having an inner sloped wall spaced from the trough inner wall thereby defining a sealing apparatus space, a sealing ring in the sealing apparatus space, said sealing ring having a top surface adapted to closely approach an inner surface of the closure with a gasket there-between and also having a sloped inner surface adapted to closely approach the trough inner wall with a gasket there-between, means extending through the closure adapted to displace the ring in an axial direction to effect sealing by applying pressure to said gaskets, a plurality of arcuate wedges with outer sloped surfaces complementary to the closure flange sloped inner surface between the sealing ring outer surface and the flange inner surface, and means extending through the closure adapted to displace the arcuate wedges axially and independently of the ring and into contact with the ring outer surface and the closure flange sloped inner surface.

The connecting means for releasably securing the closure to the vessel can be a plurality of shear studs positioned in shear stud receiving threaded holes extending partially in the closure peripheral surface and partially in the trough outer wall. Alternatively, the connecting means can be a conventional breech lock structure in which the blocks are integral with the vessel and the closure and with spaces between blocks permitting the closure to be inserted. By rotating the closure the blocks are aligned and locked.

BRIEF DESCRIPTION OF THE DRAWINGS

FIG. 1 is an elevational view of a spherical vessel having a removable closure;

FIG. 2 is an elevational view of a vertical cylindrical vessel having a hemispherical bottom and a removable closure elliptical in section in the top;

FIG. 3 is a vertical sectional view taken along the line 3—3 of the joint used on the vessel illustrated in FIG. 1;

DETAILED DESCRIPTION OF THE DRAWINGS

Figure 4:
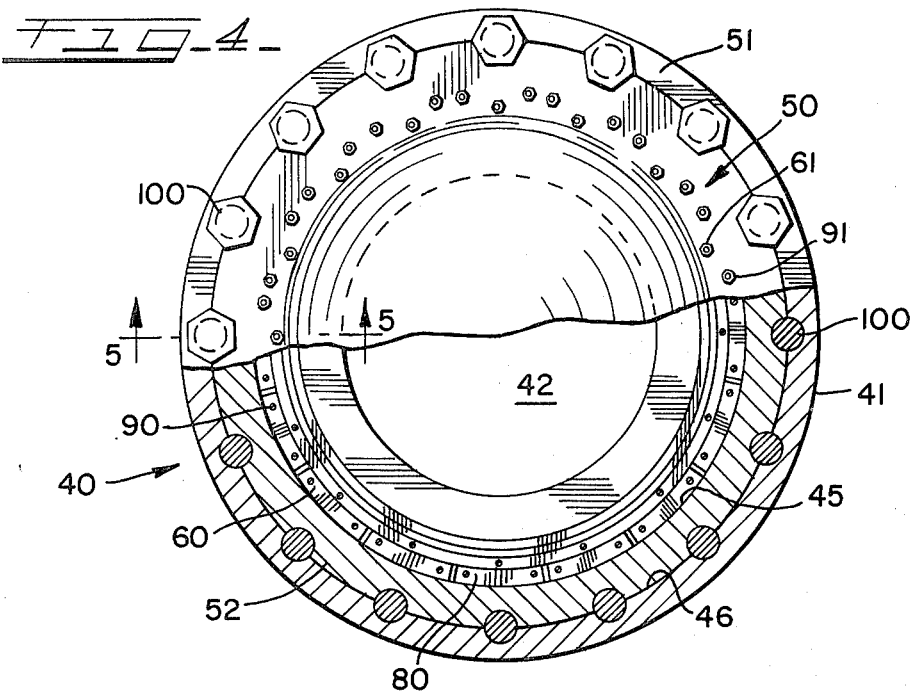
FIG. 4 is a plan view, partially broken away, of a pressure vessel having a removable or releasable closure.

So far as is practical, the same elements or parts which appear in the various view of the drawings will be identified by the same numbers.

With reference to FIG. 1, the spherical metal vessel 10 is largely composed of a metal shell body 11 in the shape of a spherical zone. The circular opening in spherical zone 11 is closed with a removable closure 12 secured in place by means of a joint 15 shown in greater detail in FIG. 3. The removable closure 12 is also a metal shell in the form of a spherical zone. Both the closure 12 and vessel body 11 are doubly curved shells throughout, including the portions at the joint 15.

The metal vessel 20 shown in FIG. 2 has a body composed of a vertical cylindrical shell portion 21 and a hemispherical shell bottom 22. The circular opening at the top of the vessel body is closed by a removable closure 24 in the form of a metal shell, having a partial elliptical cross-section, secured in place by joint 15. The cylindrical shell portion 21 is a single curved structure throughout, including the portion at joint 15. However, the closure 24 is a double-curved shell throughout, even at the joint 15.

FIG. 3 illustrates in greater detail the joint 15 used on the vessels of FIGS. 1 and 2. However, the shell portions on joint 15 shown in FIG. 3 are those of the vessel 10 of FIG. 1.

As shown in FIG. 3, circular wall 26 surrounds the opening of shell body 11 and projects axially outwardly from the opening. Annular flange 28 is located around the circular periphery of closure 12 and is so dimensioned as to have its inner surface 29 surrounding the outer surface 30 of wall 26 and in contact therewith, thus providing means for transmitting radial forces from the flange 28 to wall 26. Outer wall 27 also projects from shell body 11 and with inner wall 26 they defined a trough in which annular flange 28 securely fits. A plurality of spaced apart shear studs 31 are threaded into holes which are one-half in outer wall 27 and one-half in flange 28. The shear studs serve to resist the axial force applied against the interior surface of closure 12. Seal 32 is provided to make the joint gas-tight.

It will be readily seen that joint 15 is so designed as to have the lines of force intersect at that portion of the joint which minimizes moments which produce rotation and distortion. As shown in FIG. 3, the horizontal line of force A—A, the line of force B—B through the shell, and the vertical or axial line of force C—C intersect at point X. By taking the principle lines of force through a common, or close to common, point minimum distortion is achieved at a joint where one double curved shell joins another shell, which is single or double curved, while permitting use of thinner metal plates for the shell than would otherwise be permissible.

Although the joint 15 shown in detail in FIG. 3 has shear studs 31 to hold the closure 12 in place, it should be recognized that other means can be used, including bolts, shear rings and pins. When horizontal pins are used, the outer wall 27 could probably be eliminated since the pins could extend through flange 28 into wall 26. Furthermore, while FIG. 3 shows shell 11 as double curved, such a shell could be replaced with single curved cylindrical shell 21 as shown in FIG. 2.

Figure 5:
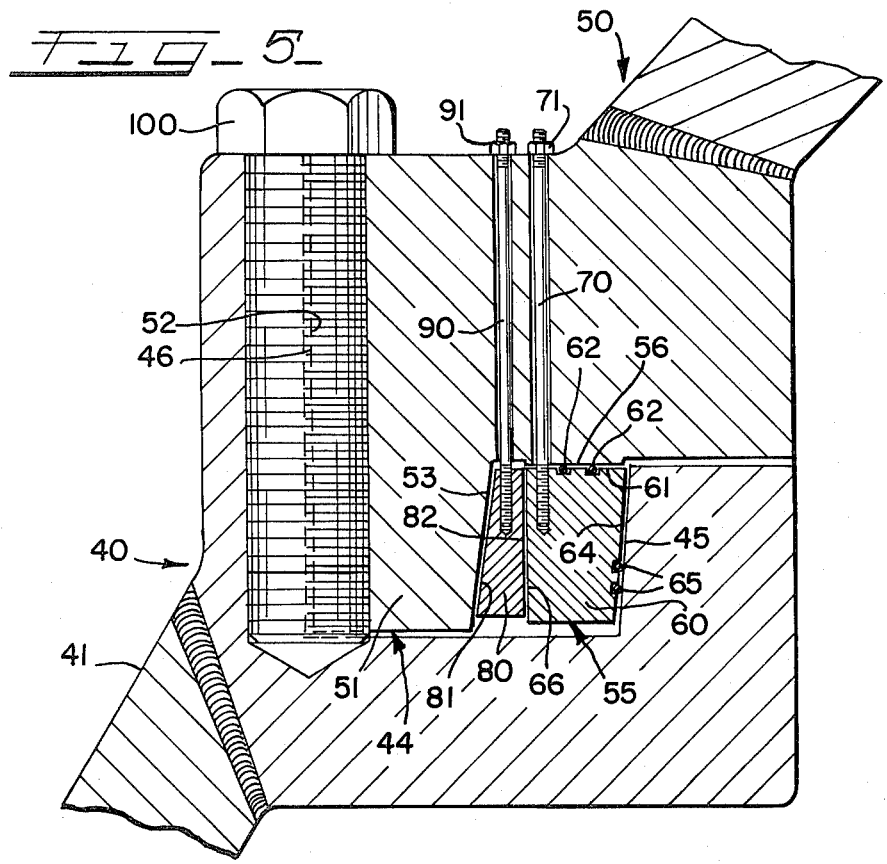
FIG. 5 is a sectional view taken along the line 5—5 of FIG. 4.

As shown in FIGS. 4 and 5 of the drawings, the spherical or doubly curved vessel 40 has a walled body 41 which defines an opening 42 at the top. The walled body 41 has a circular trough 44, surrounding the opening, defined by an inner wall 45 and an outer wall 46. The inner wall 45 is axially sloped.

The vessel 40 is covered by a removable closure 50 having an annular flange 51 with an outer peripheral surface 52 adjoining and complementary to the trough outer wall 46. The closure annular flange 51 has an inner sloped wall 53 spaced from the trough inner wall 45 thereby defining a sealing apparatus space 55 there-between.

Sealing ring 60 is positioned in the sealing apparatus space 55. Sealing ring 60 has a top surface 61 adapted to closely approach inner surface 56 of closure 50 with one or more gaskets 62 therebetween. Also, sealing ring 60 has a sloped inner surface 64 adapted to closely approach the trough inner wall 45 with one or more gaskets 65 therebetween. A series of bolts 70 arranged in a circular pattern are secured at their lower ends to sealing ring 60. The bolts extend upwardly through holes in the closure to the top where a nut 71 is located on the top of each bolt.

A plurality of slightly spaced apart arcuate wedges 80, with outer sloped surfaces 81 complementary to the closure sloped inner surface 53, are located between the sealing ring outer surface 66 and the flange inner surface 53. The inner surfaces 82 of wedges 80 are axial and adapted to smoothly and uniformly contact outer surface 66 of the sealing ring. Bolts 90 are arranged in a circular pattern with their lower ends secured in wedges 80. Generally, at least two bolts will control each wedge 80. The bolts 90 extend through oversized holes in the closure and project above the closure top surface. A nut 91 is placed on the top of each bolt 90.

Shear stud-receiving threaded holes extend partially in the closure peripheral surface 52 and partially in the trough outer wall 46. These holes are adapted to receive shear studs 100.

In order to close vessel 40 with closure 50, the sealing ring 60 and adjustable wedges 80 are positioned in place with the wedges in a downward position so as to permit independent movement of sealing ring 60 relative to the closure. In this way, tolerance for machining inaccuracy is accommodated. Sealing ring 60 is lowered by bolts 70 so that when the closure is put in place a tight seal will develop at gaskets 65. The closure is then placed over the vessel opening and shear studs 100 are put in position. Bolts 70 are then used to pull sealing ring 60 upwardly so as to develop a seal at gaskets 62. This movement is achieved without breaking the seal at gaskets 65 because there is only a slight slope to the mating walls 45 and 64. After the seal is positioned as described, the wedges 80 are moved tightly upwardly by bolts 90. Not all bolts will be moved upwardly the same distance since the spacing between the sealing ring 60 and flange inner surface 53 will vary because of machining tolerances. The wedges are not used to develop the seal. The function of the wedges 80 is to resist radial forces which develop as a result of pressure on the inside of the closure. The shear studs 100 resist axial load but not radial forces. When pressure is applied to the inside of closure 50 the wall 53 of flange 51 applies an inwardly directed radial force against the wedges which in turn transfer the load to sealing ring 60, and ultimately to mating flange 41.

Although the invention has been specifically described with respect to joining a closure on a pressure vessel, it should be understood that the invention also can be used to sealably join a first member to a second member, particularly those having circular ends to be united as, and for example, cylindrical bodies.

The gaskets can be made of any suitable material including polymeric materials, such as rubber, or of metal such as soft steel, zinc, aluminum or copper. Although the drawings show two gaskets 62 and two gaskets 65, only one such gasket need be employed but, of course, more than two can also be used.

This detailed description has been given for clearness of understanding only, and no unnecessary limitations should be understood therefrom, as modifications will be obvious to those skilled in the art.

What is claimed is:

1. An improved joint for removably attaching two members together comprising:
    a first member having a circular opening and a circular wall surrounding the opening and projecting axially outwardly from the opening
    a double curved second member with a circular periphery having an annular flange with an inner surface surrounding the first member wall,
    an adjustable spacer for transmitting radial forces from the second member annular flange to the first member wall, and
    means at the joint for removably securing the first and second members together.

2. An improved joint for removably attaching two members together comprising:
    a first member having a circular opening and a circular trough surrounding the opening defined by a pair of spaced-apart inner and outer walls,
    a double curved second member with a circular periphery having an annular flange with an outer peripheral surface adjoining and complementary to the trough outer wall inner surface,
    an adjustable spacer for transmitting radial forces from the second member annular flange to the first member inner wall, and
    means at the joint for removably securing the first and second members together.

3. An improved joint and sealing means for removably attaching two pressure vessel members together comprising:
    a first member having a circular opening and a circular trough surrounding the opening defined by a pair of spaced apart inner and outer walls, with said inner wall being sloped,
    a double curved second member having an annular flange with an outer peripheral surface adjoining and complementary to the trough outer wall,
    said closure annular flange having an inner sloped wall spaced from the trough inner wall thereby defining a sealing apparatus space,
    a sealing ring in the sealing apparatus space,
    said sealing ring having a top surface adapted to closely approach an inner surface of the second member with a gasket therebetween, and also having a sloped inner surface adapted to closely approach the trough inner wall with a gasket therebetween,
    means extending through the second member adapted to displace the ring in an axial direction to effect sealing by applying pressure to said gaskets,
    a plurality of arcuate wedges, with outer sloped surfaces complementary to the second member flange sloped inner surface, between the sealing ring outer surface and the flange inner surface, and
    means extending through the second member adapted to displace the arcuate wedges axially of, and independently of, the ring and into contact with the ring outer surface and the second member flange sloped inner surface.

4. An improved joint according to claim 3 in which the first and second members are adapted to be joined by shear studs.

5. In a pressure vessel having a double curved walled body with an opening and a double curved closure for the opening of the walled body securable in place by shear studs, the joint improvement comprising:

a circular trough in the walled body surrounding the opening defined by a pair of spaced apart inner and outer walls, with said inner wall being sloped, said closure having an annular flange with an outer peripheral surface adjoining and complementary to the trough outer wall, said closure annular flange having an inner sloped wall spaced from the trough inner wall thereby defining a sealing apparatus space, a sealing ring in the sealing apparatus space, said sealing ring having a top surface adapted to closely approach an inner surface of the closure with a gasket therebetween, and also having a sloped inner surface adapted to closely approach the trough inner wall with a gasket therebetween, means extending through the closure adapted to displace the ring in an axial direction to effect sealing by applying pressure to said gaskets, a plurality of arcuate wedges, with outer sloped surfaces complementary to the closure flange sloped inner surface, between the sealing ring outer surface and the flange inner surface, and means extending through the closure adapted to displace the arcuate wedges axially of, and independently of, the ring and into contact with the ring outer surface and the closure flange sloped inner surface.

6. The improvement of claim 5 in which shear stud-receiving threaded holes extend partially in the closure peripheral surface and partially in the trough outer wall, and shear studs are positioned in the threaded holes.

* * * * *